United States Patent [19]

Madej

[11] 4,427,219
[45] Jan. 24, 1984

[54] COMPRESSION COUPLING
[75] Inventor: Edward A. Madej, Verona, Pa.
[73] Assignee: Robroy Industries, Verona, Pa.
[21] Appl. No.: 230,116
[22] Filed: Jan. 26, 1981
[51] Int. Cl.[3] ............................................. F16L 33/22
[52] U.S. Cl. .................................... 285/249; 285/255; 285/331
[58] Field of Search .............. 285/249, 255, 239, 242, 285/246, 331, 113, 256, DIG. 7, 306, 307, 104, 105, 247, 248, 249, 369

[56] References Cited
U.S. PATENT DOCUMENTS

| | | | |
|---|---|---|---|
| 1,486,421 | 3/1924 | Dyer | 285/249 X |
| 2,321,260 | 6/1943 | Stecher | 285/249 |
| 3,226,137 | 12/1965 | Trnka | 285/255 X |
| 3,404,905 | 10/1968 | Albrecht | 285/249 |
| 3,428,339 | 2/1969 | Haulik et al. | 285/94 |
| 3,596,933 | 8/1971 | Luckenbill | 285/94 |
| 3,679,239 | 7/1972 | Schmitt | 285/331 X |
| 3,685,860 | 8/1972 | Schmidt | 285/249 |
| 3,784,236 | 1/1974 | Slocum | 285/45 |
| 3,834,742 | 9/1974 | McPhillips | 285/249 |
| 4,120,521 | 10/1978 | Parmann | 285/113 |
| 4,157,843 | 6/1979 | Trnka | 285/113 |

FOREIGN PATENT DOCUMENTS

| | | | |
|---|---|---|---|
| 115489 | 7/1942 | Australia | 285/256 |
| 875742 | 8/1961 | United Kingdom | 285/247 |
| 1477074 | 6/1977 | United Kingdom | 285/369 |

Primary Examiner—Dave W. Arola
Attorney, Agent, or Firm—Stanley J. Price, Jr.; John M. Adams

[57] ABSTRACT

A tubular fitting is threaded at one end for connection to a valve, meter, or the like and at the opposite end to a compression nut. A bore extends through the fitting and includes a tapered or restricted portion. The tapered portion forms an internal shoulder. A compressible sleeve is positioned in the fitting bore opposite the internal shoulder. A reinforcing insert extends through the sleeve. The insert abuts the end of the sleeve. An annular space is provided between the sleeve and the insert for receiving an unthreaded conduit. The insert includes a plurality of annular serrations adapted to frictionally engage the end of the conduit positioned in the annular space. The application of a force on the conduit in a direction to pull the conduit out of the fitting advances the sleeve against the fitting internal shoulder. The sleeve is compressed onto the flexible conduit to increase the frictional engagement of the conduit with the insert serrations. As the pullout force on the conduit increases, the insert pushes axially against the sleeve to increase the compression of the sleeve against the fitting internal shoulder. Thus the frictional engagement of the conduit to the insert is increased to prevent pullout of the conduit from the fitting.

16 Claims, 9 Drawing Figures

COMPRESSION COUPLING

BACKGROUND OF THE INVENTION

1. Field of Invention

This invention relates to a compression coupling and more particularly to a coupling for connecting a conduit, such as an unthreaded metal pipe or a plastic pipe, to a valve, meter, or the like where a portion of the conduit positioned within the coupling is reinforced by an insert that remains frictionally engaged to the conduit to prevent pullout of the conduit and insert from the fitting.

2. Description of the Prior Art

Compression couplings are well known in the art for connecting flexible conduits or plastic pipe and unthreaded metal pipe to a main fluid distribution line or to the fitting of a valve body or a meter, such as a customer gas or water meter. In recent years, it has become the common practice to connect nonmetallic pipes, such as pipes fabricated of polyvinyl chloride (PVC), polyethylene (PE), polybutylene (PB) and the like to metallic pipes, valves, meters, etc. by compression couplings for the distribution of gas and water. A typical coupling for connecting nonmetallic, plastic pipes to fittings or metal pipes is disclosed in U.S. Pat. No. 3,596,933.

A typical compression coupling is disclosed in U.S. Pat. No. 3,784,236 and includes a coupling nut assembly having a compression nut threadedly engageable with a tubular fitting. Threadedly advancing the nut on the fitting compresses an elastomeric sealing gasket into annular compressing contact with a flexible conduit, such as a plastic pipe. By compressing the annular gasket against the flexible conduit, the conduit is retained in the coupling nut assembly. This arrangement also provides a seal between the coupling nut assembly and the plastic conduit.

In order to prevent crimping or breaking of the flexible conduit at its connection to the coupling nut assembly, it is the common practice to reinforce the flexible tubing by a stiffener sleeve or reinforcing insert positioned within the flexible conduit in underlying relation with the compression nut. With this arrangement when the nut is tightened down on the fitting, the stiffener reinforces the flexible conduit to prevent distortion of the flexible conduit. Examples of stiffener sleeves or reinforcing inserts are disclosed in the following U.S. Pat. Nos. 3,404,905; 3,428,339; 3,596,933; 3,685,860; 3,784,236; 3,834,742; and 4,032,177. For the stiffener sleeve to remain effective, it must be retained within the fitting in underlying relation with the portion of the flexible conduit positioned oppositely of the sealing gasket. It is at this point along the flexible conduit where tightening of the nut on the fitting applies pressure upon the flexible conduit.

A common problem encountered with couplings for plastic pipes utilizing a stiffener sleeve is pullout of the stiffener sleeve and conduit through the annular sealing gasket and out of the coupling fitting. In addition if relative movement is permitted between the stiffener sleeve and the conduit, the stiffener sleeve may be pulled out of the coupling or displaced from reinforcing position within the coupling. This reduces the length or stab depth of the flexible conduit in the coupling. The stab depth of the flexible conduit in the coupling should be sufficient to permit limited movement of the conduit relative to the coupling so that a sufficient length of the conduit remains in the coupling and is reinforced by the sleeve.

While it has been suggested by the prior art devices to reinforce a flexible conduit by a stiffener element within a coupling assembly joining the flexible conduit to another pipe or fixture, the prior art devices rely principally upon retaining the conduit in the fitting by tightening the compressive nut to compress the sealing gasket on the flexible conduit. Such arrangements have not proved satisfactory in preventing pullout of the conduit and to the stiffener element from the coupling fitting. Also if the sealing gasket should loose its resilient properties, then the conduit will not be sufficiently compressed to resist pullout of the conduit and the stiffener from the fitting.

Therefore, there is need to provide in a compression-type coupling an arrangement for retaining both the stiffener element and the conduit locked within the fitting to resist pullout of the conduit and the stiffener element.

SUMMARY OF THE INVENTION

In accordance with the present invention there is provided a compression-type coupling for connection to a conduit that includes a fitting having a body portion with a bore extending therethrough. An internal shoulder of the body portion surrounds the bore. A sleeve is positioned in the fitting bore. The sleeve includes a body portion having a first end portion and a second end portion. A reinforcing insert is positioned in the fitting bore and extends through the sleeve. The reinforcing insert includes a tubular body portion having first and second end portions and a passageway extending therethrough. The reinforcing insert extends into the sleeve and forms an annular space between the reinforcing insert and the sleeve. Means is positioned on the reinforcing insert first end portion for engaging the insert to the sleeve first end portion. The sleeve second end portion is positioned adjacent the fitting internal shoulder. Gripping means extending between the reinforcing insert tubular body portion and a conduit positioned in the annular space frictionally engages the conduit to the reinforcing insert. The sleeve second end portion is urged against the fitting internal shoulder by the force of the reinforcing insert first end portion applied to the sleeve when a force is applied to the conduit in a direction to pull the conduit out of the fitting. The sleeve body portion is engageable with the conduit to urge the conduit into increased frictional engagement with the insert to retain the insert in the fitting and prevent pullout of the conduit from the fitting.

Preferably the gripping means includes a plurality of annular protrusions or serrations on the surface of the reinforcing insert. The protrusions become embedded in locking engagement with the inner surface of the conduit upon compression of the sleeve when a force tending to pull the conduit from the fitting is applied to the conduit. The frictional engagement of the conduit to the insert is enhanced by compression of the sleeve in response to a pullout force applied to the conduit and the end of the insert pushing the sleeve against the fitting internal shoulder.

When an axial force tending to pull the conduit out of the fitting is applied to the conduit, the insert pushes against the sleeve in the direction of the pullout force to compress the opposite end of the sleeve against the internal shoulder of the fitting. Accordingly, an increase in the pullout force increases the force exerted by the end of the insert on the sleeve to increase the compression of the sleeve against the fitting. The compressive forces applied to the sleeve are transmitted to the conduit. Thus the compression of the conduit in surrounding relation with the insert increases and the conduit is locked on the insert to prevent relative movement therebetween.

Preferably the sleeve is fabricated of a molded compressible material. In one embodiment the sleeve is injection molded within the coupling in surrounding relation with the reinforcing insert positioned within the fitting. The sleeve is molded so that the first end portion encapsulates an enlarged or abutment end of the insert. The abutment end serves as the means for engaging the insert to the sleeve first end portion. Also the sleeve is molded to form the annular space between the sleeve and the insert to receive the end of the conduit. Upon assembly of the coupling, the end of the conduit is inserted into the annular space and frictionally engages the serrations on the surface of the insert. Exerting an axial force upon the conduit tending to pull it out of the fitting increases the frictional engagement of the conduit with the serrations as a result of the insert urging the sleeve against the internal shoulder of the fitting.

In another embodiment, the sleeve is preformed of a molded compressible material having a reduced first end portion abutting the enlarged end portion of the insert and an enlarged second end portion which is compressed inwardly when the sleeve is advanced into position within the fitting. The conduit is then advanced into the fitting and into surrounding relation with the insert to position the conduit between the insert and the sleeve. A pullout force applied to the conduit is transmitted to the insert, and the insert pushes the sleeve against the internal shoulder of the fitting. The sleeve is compressed as well as the conduit to thereby secure the conduit on the insert to resist pullout from the fitting.

In a further embodiment the sleeve has a cylindrical body portion of a uniform diameter with the first end portion abutting the enlarged end of the insert. The second end portion is flared outwardly in a tapered configuration. Upon insertion of the insert and the sleeve into the fitting bore the flared end portion is compressed to permit the sleeve to advance into position in the fitting bore past the internal shoulder of the fitting. Once past the internal shoulder, the flared end portion expands outwardly. The internal shoulder obstructs movement of the sleeve by contact with the flared end portion in the direction of the pullout force. The flared end portion is urged against the internal shoulder when a pullout force is applied resulting in compression of the conduit on the insert to retain the conduit in the fitting.

Further in accordance with the present invention there is provided a method of connecting a conduit to a coupling that includes the steps of inserting a sleeve in a bore of a coupling fitting. A reinforcing insert is positioned within the sleeve in the coupling fitting. The reinforcing insert is spaced radially from a portion of the sleeve to form an annular space between the reinforcing insert and the sleeve. The reinforcing insert is engaged to a first end portion of the sleeve. A conduit is positioned in the annular space between the reinforcing insert and the sleeve. A second end portion of the sleeve is positioned adjacent an internal shoulder of the coupling fitting. Applying a force on the conduit in a direction tending to pull the conduit out of the coupling urges the reinforcing insert against the sleeve first end portion to force the sleeve second end portion into compression with the internal shoulder. The sleeve is compressed on the conduit to frictionally engage the conduit to the insert to retain the insert in the coupling and prevent pullout of the conduit from the coupling.

Accordingly the principal object of the present invention is to provide a compression-type coupling for joining an unthreaded conduit to a threaded pipe, threaded fixture, or the like where the conduit is securely retained within the fitting to prevent pullout of the conduit from the fitting.

Another object of the present invention is to provide a compression-type coupling for connecting a flexible conduit to a threaded pipe in which the flexible conduit is reinforced by an insert that is forceably and frictionally engaged to the conduit to prevent relative movement between the insert and the conduit and retain the insert in the conduit.

An additional object of the present invention is to provide in a compression-type coupling for connecting non-metallic, plastic pipe to a fitting, a compressible sleeve positioned within the fitting in surrounding relation with the flexible pipe which is reinforced by an insert where a pullout force exerted on the pipe urges the sleeve into compression with the fitting to increase the compressive forces applied by the sleeve on the conduit to lock the conduit to the insert and to lock the insert inside the fitting.

These and other objects of the present invention will be more completely disclosed and described in the following specification, accompanying drawings, and the appended claims.

DESCRIPTION OF THE PREFERRED EMBODIMENTS

Figure 2:
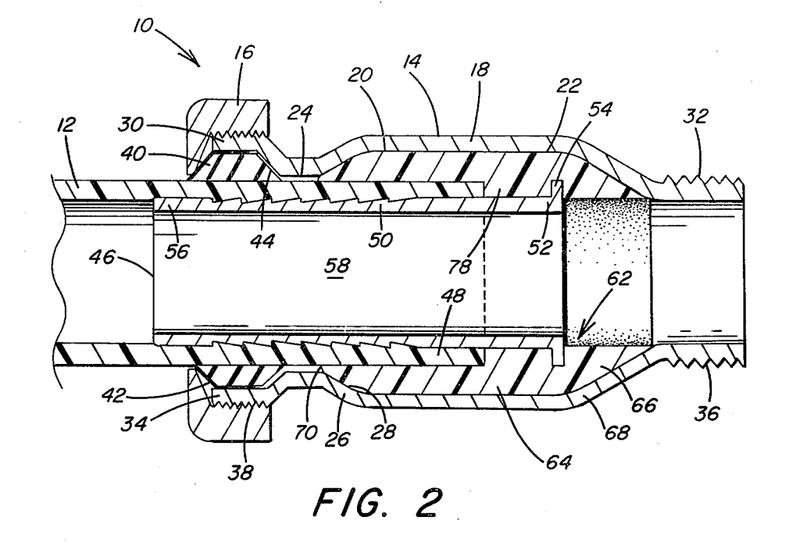
FIG. 2 is a fragmentary view in side elevation of an assembled compression coupling, illustrating a nut threaded on the end of the fitting to compress a seal gasket on the conduit and the conduit compressed by the sleeve into frictional engagement with the reinforcing insert.
Figures 3, 3A, 3B, 4:
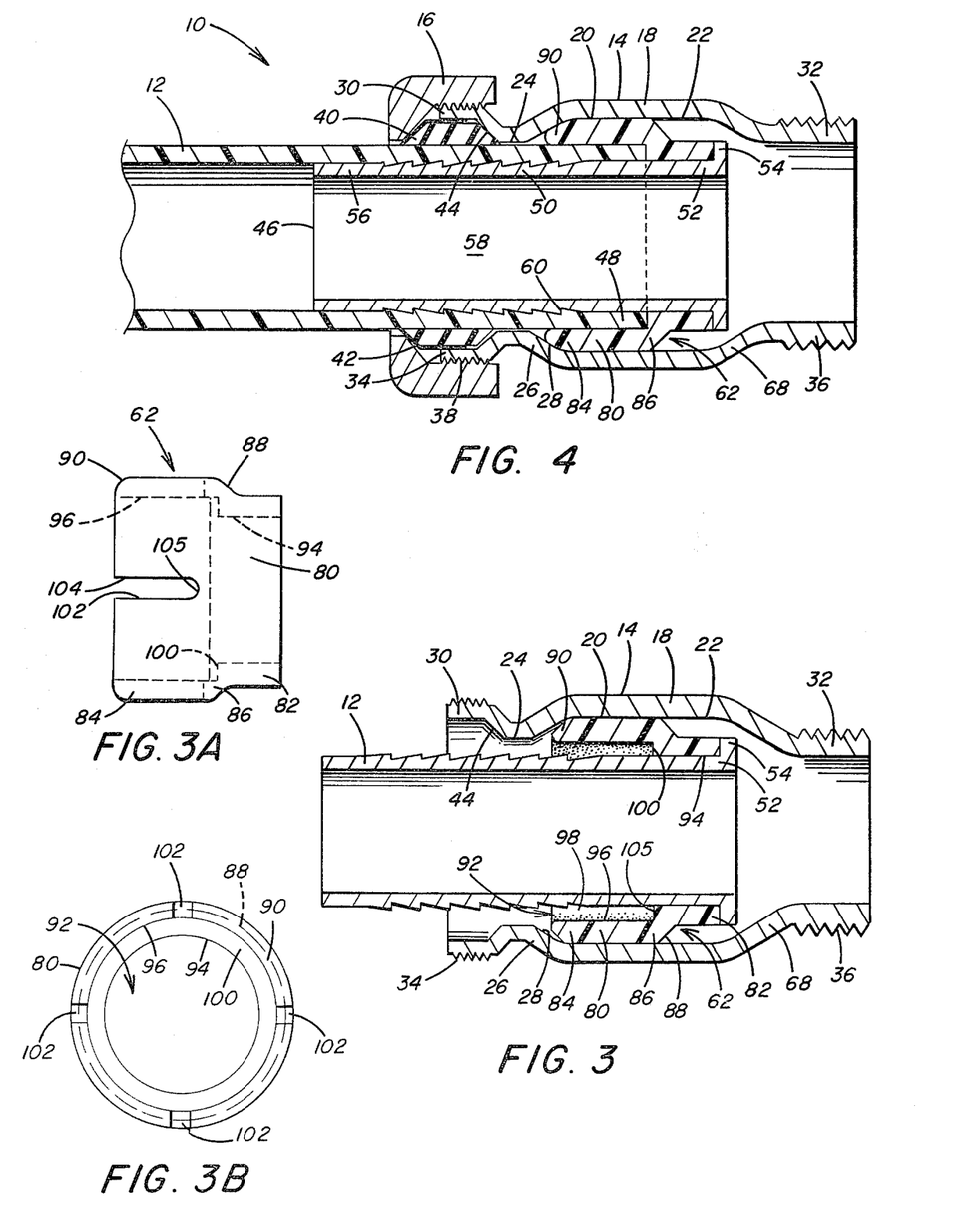
FIG. 3 is a view similar to FIG. 1, illustrating another embodiment of the compressible sleeve positioned on the reinforcing insert in abutting relation with the end of the insert and the inner surface of the fitting.
FIG. 3A is a view in side elevation of an embodiment of the compressible sleeve having a slotted portion.
FIG. 3B is a top plan view of the sleeve shown in FIG. 3A, illustrating the spacing of the slots on the periphery of the sleeve.
FIG. 4 is a view similar to FIG. 2 of the assembled compression coupling, illustrating the sleeve compressed by the tapered portion of the fitting to compress the flexible conduit into gripping engagement with the serrations of the insert.
Figure 7:
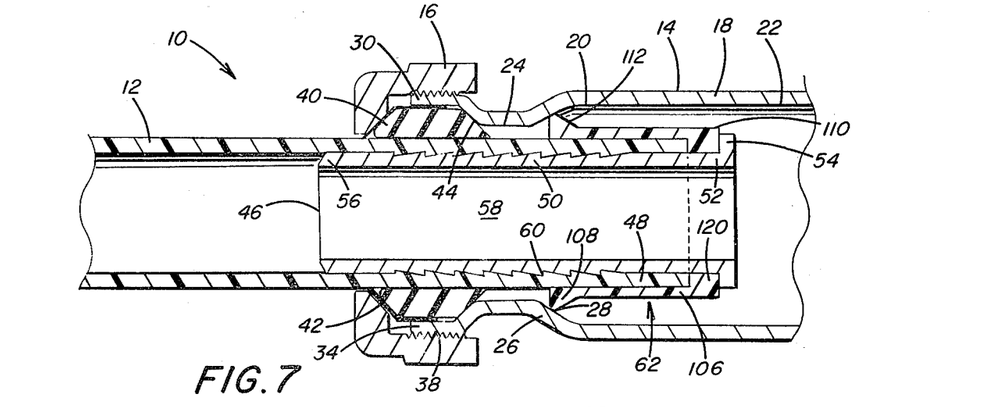
FIG. 7 is a fragmentary view in side elevation of an assembled compression coupling, illustrating the embodiment of the compressible sleeve shown in FIG. 6 with the flared end compressed by the fitting when a pullout force is applied to the conduit to compress the conduit on the insert.

Referring to the drawings, and particularly FIGS. 2, 4, and 7, there is illustrated a compression coupling assembly generally designated by the numeral 10 for connection to an unthreaded conduit 12, such as a plastic pipe. The compression coupling assembly 10 includes an externally threaded fitting or male member 14 and an internally threaded nut or female member 16. The fitting 14 includes an elongated body portion 18 with a bore 20 extending therethrough. The bore 20 has an enlarged diameter portion 22 and a reduced diameter portion 24 separated from the enlarged diameter portion 22 by a tapered portion 26 that forms an internal shoulder 28. The transition from the enlarged diameter portion 22 to the reduced diameter portion 24 may have any preselected configuration, such as a right angled shoulder, a cup shape, etc. as long as a stop is formed internally within the fitting 14. In addition, the fitting 14 includes end portions 30 and 32 having externally threaded portions 34 and 36 respectively. The compression nut 16 includes an internally threaded portion 38 engageable with the fitting externally threaded portion 34. In addition, a compression nut can be utilized on the externally threaded portion 36. Also, either of the end portions 34 and 36 can be other than threaded connections, such as weld-end connections or both provided with nuts 16 to connect unthreaded conduits to both end portions 34 and 36 in accordance with the present invention.

In the completed assembly 10, illustrated in the embodiments of FIGS. 2, 4, and 7, an annular sealing gasket 40 is positioned within the fitting bore 20 adjacent the threaded portion 34 and in underlying relation with the nut 16 on the threaded portion 34. Preferably, the annular sealing gasket 40 is fabricated of an elastomeric composition, such as a natural rubber or synthetic rubber or rubber-like compositions. A cup-shaped retainer 42 surrounds a portion of the gasket 40. The retainer 42 is positioned between the fitting end portion 30 and the gasket 40. The retainer 42 is positioned closely adjacent the outer surface of the conduit 12 that extends into the fitting 14 but is preferably removed from contact with the conduit 12. The retainer 42 is preferably fabricated of a rigid material, such as metal, to prevent distortion of the gasket 40.

With this arrangement the assembled compression coupling 10 threadedly advancing the nut 16 on the threaded portion 34 of the fitting 14 compresses the gasket 40 into sealing relation with the conduit 12. Thus the gasket 40 is wedged against an internal shoulder 44 of the fitting 14 when the nut 16 is tightened on the threaded portion 34. Also, the gasket 40 is compressed against the outer surface of the conduit 12 to thereby provide a seal between the conduit 12 and the fitting body portion 18 adjacent the fitting end portion 30. The presence of the retainer 42 effectively retains the gasket 40 within the fitting 14 so that the gasket 40 remains confined within the fitting 14 in surrounding sealing relation with the conduit 12. With this arrangement the gasket 40 is not extruded or deformed out of the fitting 14 not only between the conduit 12 and the nut 16 but between the fitting end portion 30 and the nut 16 when the nut 16 is not completely threaded onto the end portion 30 leaving a gap between the nut 16 and the end portion 30.

As illustrated in FIGS. 2, 4, and 7, the compression coupling assembly 10 is connected at the fitting end portion 30 to the unthreaded conduit 12, which is preferably a plastic pipe or the like, and is adapted for connection at the opposite threaded end 32 to a main distribution line for conveyance of fluid, such as gas or water. The fitting threaded end portion 32 is also adaptable for connection into an appropriate manifold, valve, meter or pipe fitting (not shown). In the alternative the end portion 32 can also receive an unthreaded conduit to be connected to the fitting 14 in accordance with the present invention. The coupling assembly 10 is adaptable for use above ground, as well as, below ground.

A reinforcing insert 46, such as a metal sleeve-like stiffener, is adaptable for insertion into an end portion 48 of the conduit 12, as illustrated in FIGS. 2, 4, and 7. The insert 46 is operable to prevent distortion of the flexible conduit 12 under the pressure of the compressed gasket 40 or under any other compressive forces applied to the conduit 12. The insert 46 includes a tubular body portion 50 having a first end portion 52 with an enlarged portion or abutment 54 extending from the first end portion 52. A second end portion 56 of the insert 46 is positioned within the conduit 12 and extends beyond the fitting end portion 30. Thus a substantial length of the tubular body portion 50 extends into the conduit 12 to reinforce the portion of the flexible conduit 12 engaged by the coupling 10, and particularly the portion engaged by the coupling 10 where the gasket 40 is compressed on the end of the conduit 12 and other compressive forces are applied to the conduit 12 when a pullout force is exerted upon the conduit 12, as will be explained later in greater detail.

The reinforcing insert 46 thus includes a passageway 58 extending between the end portions 52 and 56. Fluid passes through the insert 46 between the conduit 12 and the end portion 32 of the coupling fitting 14. Also, the body portion 50 of the insert 46 is provided with suitable gripping devices, such as annular protrusions or serrations 60, that extend around the outer surface of the insert 46 for a suitable length on the body portion 50. The serrations 60 are operable to aid in forcefully and frictionally engaging the insert 46 to the conduit 12 to prevent slipping of the conduit 12 on the insert 46 and pullout of the conduit 12 from the compression coupling assembly 10. This feature is particularly applicable to lock the insert 46 in the fitting 14 by compression of the sleeve 62 upon occurrence of the pullout force on the conduit 12.

In accordance with the present invention, a compressible sleeve generally designated by the numeral 62 in FIGS. 2, 4, and 7 is positioned in the bore 20 of the fitting 14 in surrounding relation with the conduit 12 and in abutting relation with the reinforcing insert 46. In each embodiment of the compressible sleeve 62 shown in FIGS. 2, 4, and 7, the compressible sleeve 62 is operable upon the application of an axial force upon the conduit 12 in a direction to pull the conduit 12 out of the fitting end portion 30 to be compressed against the internal shoulder 28 of the fitting body portion 14.

Compression of the sleeve 62 applies compressive forces around the plastic conduit 12 to urge the conduit 12 into gripping engagement with the serrations 60 of the insert 46 to forcefully and frictionally engage the plastic conduit 12 to the insert 46. While limited axial movement of the sleeve 62 in the fitting 14 toward the internal shoulder 28 will occur in response to a pullout force, movement of the sleeve 62 is eventually restrained by the internal shoulder 28. This also restrains movement of the insert 46 in the fitting 14. Thus a pullout force exerted on the conduit 12 actuates locking of the sleeve 62, the conduit 12, and the insert 56 to the fitting 14. With this arrangement relative movement of the conduit 12 with respect to the insert 46 and the fitting 14 is also prevented.

Figure 1:
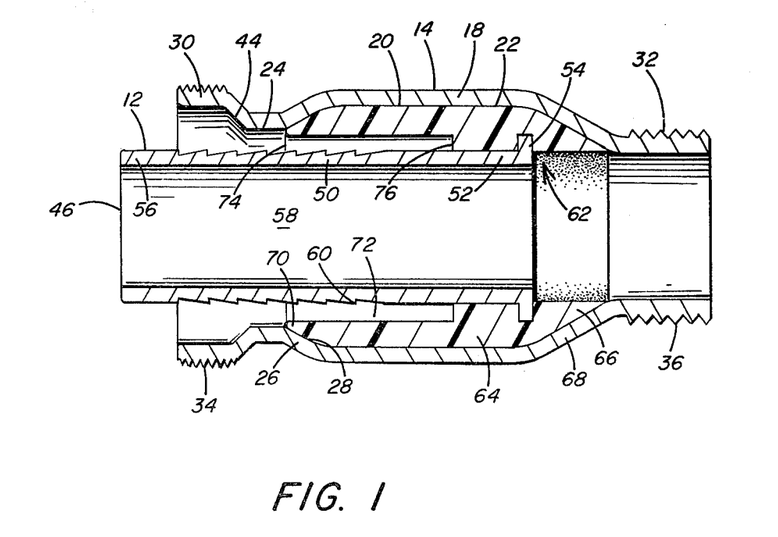
FIG. 1 is a fragmentary view in side elevation of a compressible sleeve molded within a fitting in surrounding relation with a reinforcing insert.

The embodiment of the compressible sleeve 62 illustrated in FIGS. 1 and 2 includes a body portion 64 of a compressible material, such as an elastomer, fiber glass, or any other suitable compressible material. As illustrated in FIG. 1, the sleeve body portion 64 is formed by injection molding the compressible material in surrounding relation with the reinforcing insert 46 in the fitting bore 20. Initially after the reinforcing insert 46 is selectively positioned within the fitting bore 20 with the abutment 54 positioned within the bore enlarged diameter portion 22, the end portions 30 and 32 of the fitting are suitably plugged. Then the compressible material forming the compressible sleeve 62 is injected around the reinforcing insert 46 to define a first end portion 66 of the sleeve positioned in surrounding and abutting relation with the insert abutment 54.

As illustrated in FIG. 1, the sleeve end portion 66 extends past the abutment 54 and extends the length of a tapered portion 68 of the fitting adjacent the externally threaded portion 36. Similarly, in the injection molding of the sleeve body portion 64 around the insert 46, a second or opposite end portion 70 of the sleeve 62 is formed. The end portion 70 extends beyond the internal shoulder 28 of the fitting tapered portion 26. The end portion 70 is surrounded by and abuts the fitting reduced diameter portion 24 terminating adjacent the externally threaded end portion 34.

In addition, as illustrated in FIG. 1, the sleeve body portion 64 is molded in surrounding relation with the reinforcing insert 46 to form an annular space 72. The annular space 72 extends from the fitting bore portion 24 beyond the insert serrations 60 to an annular space closed end portion 76 spaced from the insert abutment 54. With this arrangement the annular space 72 has an open end 74 and the closed end 76. Suitable means, as well known in the art of injection molding, are used to plug the end portions 30 and 32 of the fitting 14 to form the sleeve body portion end portion 66 and 70 positioned in surrounding relation with the reinforcing insert 46 and to form the annular space 72 around the insert 46.

By injection molding the compressible sleeve 62 into the fitting 14 in surrounding relation with the reinforcing insert 46, the reinforcing insert 46 is securely anchored within the fitting 14. This engagement is accomplished by encapsulating or surrounding the insert abutment 54 with the material forming the compressible sleeve body portion 64. In addition, by conforming the outer periphery of the body portion 64 to the fitting tapered portions 26 and 68, the body portion 64 is captured within the fitting bore 20.

The sleeve body portion 64 fills the area between the outer surface of the insert 46 and the inner surface of the fitting body portion 18 within the fitting bore enlarged diameter portion 22. With the sleeve 62 injection molded in the fitting bore 20 and by encapsulating the insert abutment 54 with the sleeve end portion 66 the sleeve 62 is securely connected to the insert 46. Thus with the sleeve 62 being securely retained within the fitting 14, the insert 46 is also securely retained within the fitting 14.

The compression coupling assembly 10 is completed, as illustrated in FIG. 2, by insertion of the unthreaded or plastic conduit 12 with the annular sealing gasket 40 positioned thereon through the fitting end portion 30 and into the annular space 72 between the reinforcing insert 46 and the compressible sleeve 62. The conduit 12 is advanced on the reinforcing insert 46 until the end portion 48 of the conduit 12 is positioned opposite the closed end 76 of the annular space 72 which forms a shoulder portion 78 of the sleeve 62 for receiving in abutting relation the conduit end portion 48.

As further illustrated in FIG. 2, the compressible sleeve 62 is molded in surrounding relation with the reinforcing insert 46 to form the annular space 72 having an inner and an outer diameter corresponding to the inner and outer diameter of the conduit 12. With this arrangement the conduit 12 is freely advanced into the annular space 72 into abutment with the shoulder 78. The insert serrations 60 are urged into frictional engagement with the inner surface of the conduit 12. In the case of a flexible or plastic conduit, the insert serrations 60 become embedded in the body portion of the conduit 12 so that the insert 46 forcefully grips the conduit 12. Accordingly, the serrations 60 are arranged on the insert 46 so that when an axial force is applied to the end of the conduit 12 tending to pull the conduit 12 out of the fitting end portion 30, the serrations are urged into increasing gripping engagement with the conduit 12. Thus an increase in the pullout force on the conduit 12 increases the frictional engagement of the conduit 12 with the insert 46.

In accordance with the present invention, when a pullout force is applied to the conduit 12 because the conduit 12 is in frictional engagement with the reinforcing insert 46, a pullout force is also applied to the insert 46. A pullout force exerted on the reinforcing insert 46 urges the insert abutment 54 to apply an increased axial force upon the sleeve end portion 66 surrounding the abutment 54 in the direction of the pullout force or in a direction toward the end portion 30 of the fitting 14. Thus any relative movement existing between the molded body portion 64 and the reinforcing insert 46 is taken up and the sleeve body portion 64 and the insert 46 are united. Consequently, the end portion 70 of the sleeve body portion 64 positioned opposite the fitting tapered portion 26 is compressed or squeezed against the internal shoulder 28.

As the pullout force on the conduit 12 increases, the compression of the sleeve 62 by the fitting tapered portion 26 increases. The compressive forces exerted upon the sleeve 62 by the fitting internal shoulder 28 are transmitted through the sleeve body portion 64 to the conduit 12. The conduit 12 is thus compressed to further urge the conduit 12 into frictional or gripping engagement with the periphery of the reinforcing insert 46. The serrations 60 are then further embedded in the body of the conduit 12. Consequently, the end of the conduit 12 is securely locked to the reinforcing insert 46 which, in turn, is connected to the compressible sleeve 62 to lock the insert 46 to the fitting 14. The conduit 12 is thereby also securely locked to the fitting 14.

With the present invention as the pullout forces on the conduit 12 increase, the locking engagement of the conduit 12 to the reinforced insert 46 increases. If the pullout forces of the conduit 12 continue to increase beyond the elastic limit of the conduit 12, the conduit 12 will fail or break before the conduit is pulled out of the fitting 14. A further advantage of this arrangement is maintaining a preselected stab depth of the conduit 12 in the fitting 14. By retaining the conduit 12 in forceful and frictional engagement with the reinforcing insert 46, a preselected length of the conduit 12 is retained within the fitting 14. This overcomes the problems previously encountered in slippage of the conduit 12 on the reinforcing insert 46 within the fitting 14 where only the extreme end of the conduit 12 is connected to the coupling assembly 10. In this event pullout of the conduit 12 from the fitting 14 is more likely to occur.

To complete the connection of the conduit 12 to the fitting 14, the compression nut 16 is tightened onto the fitting externally threaded portion 34. Prior to insertion of the conduit 12 into the fitting 14, the nut 16 is positioned in spaced relation and opposite to the fitting threaded end 34 or surrounding the end of the conduit 12. Then when the conduit 12 is inserted into the position illustrated in FIG. 2, the nut 16 is advanced into threaded engagement on the fitting 14. Accordingly, as above discussed, threadedly advancing the nut 16 on the fitting 14 compresses the gasket 40 into sealing engagement with the conduit 12. The gasket 40 is wedged against the fitting internal shoulder 44 to provide an effective fluid-tight seal around the conduit 12 and between the fitting 14 and the conduit 12 at a location spaced from the sleeve end portion 70.

Now referring to FIGS. 3 and 4, there is illustrated a further embodiment of the compressible sleeve 62 that includes a unitary body portion 80 that is premolded in a preselected configuration for insertion with the reinforcing insert 46 into the fitting bore 20. Initially, this embodiment of the compressible sleeve 62 is prefabricated to form the body portion 80 of a preselected compressible material of the type used to injection mold the compressible body portion 64 in the fitting 14, as above discussed. Thus the sleeve body portion 80 is positioned on the reinforcing insert 46 so that an end portion 82 is positioned opposite the insert abutment 54. Then the insert 46 with the sleeve 62 positioned thereon is advanced into the fitting bore 20 to the position illustrated in FIG. 3.

The embodiment of the compressible sleeve 62 illustrated in FIG. 3 includes the sleeve first end portion 82 having a reduced diameter in comparison with a second end portion 84 having an enlarged diameter. The end portions 82 and 84 are connected by a tapered portion 86 forming an outer shoulder 88. Also the second end portion 84 includes a tapered shoulder 90.

A passageway generally designated by the numeral 92, extends through the sleeve body portion 80 and includes a reduced diameter portion 94 and an enlarged diameter portion 96. The reduced diameter portion 94 corresponds substantially to the diameter of the reinforcing insert 46 adjacent the abutment 54 so that the sleeve body portion 80 abuts the reinforcing insert 46 adjacent the abutment 54 when the sleeve 62 is positioned on the insert 46. The enlarged diameter portion 96 of the passageway 92 is spaced from the periphery of the insert 46 to form an annular space 98 therearound similar to the annular space 72 illustrated in FIG. 1. An inturned shoulder 100 of the body portion 80 forms the end of the passageway enlarged diameter portion 96 and closes the annular space 98. Accordingly, the opposite end of the annular space 98 is open to receive, as illustrated in FIG. 4, the conduit end portion 48.

Thus with the embodiment of the compressible sleeve 62 illustrated in FIGS. 3 and 4 the sleeve body portion 80 has an outer surface positioned in abutting relation with the enlarged diameter portion of the fitting 14. The annular space surrounding the reinforcing insert 46 between the insert 46 and the internal surface of the fitting enlarged diameter portion 22 is occupied by the sleeve body portion 80. The reduced diameter portion or end portion 82 of the sleeve body portion 80 abuts the reinforcing insert 46 at the abutment 54. The enlarged diameter portion or end portion 84 of the sleeve body portion 80 abuts the inner surface of the fitting 14.

With the above described embodiment of the compressible sleeve body portion 80, prior to insertion of the reinforcing insert 46 in the fitting 14, the sleeve 62 is positioned on the insert 46 so that the sleeve first end portion 82 is positioned opposite the abutment 54. The insert 46 and the sleeve 62 thereon is then advanced into the fitting bore 20 through the fitting end portion 30.

Because the enlarged diameter portion 96 of the sleeve body portion 80 exceeds the diameter of the fitting bore reduced diameter portion or throat 24, the insert 46 must be forced into the bore 20 so as to urge the sleeve shoulder 88 along the fitting internal shoulder 44. This compresses and deforms the sleeve body portion 80 to permit the body portion 80 to pass through the fitting throat 24. Once the sleeve 62 is past the throat 24 and enters the bore enlarged diameter portion 22 due to the expansible nature of the sleeve body portion 80, the body portion 80 expands outwardly into abutting relation with the internal surface of the fitting 14.

Once the reinforcing insert 46, the sleeve 62, and the conduit 12 are positioned in the fitting bore 20, by exerting a pullout force on the conduit 12 the abutment 54 is compressed against the sleeve first end portion 82. Consequently, the sleeve tapered shoulder 90 is compressed against the fitting internal shoulder 28. This action applies compressive forces through the sleeve body portion 80 to the conduit 12 in the annular space 98. The conduit 12 is, in turn, compressed onto the insert 46 to force the serrations 60 into increased frictional engagement with the conduit 12. The conduit 12 is then locked to the insert 46 to, in turn, lock the insert 46 to the fitting 14.

When a pullout force is applied to the conduit 12, the pullout force is transmitted to the insert 46. Consequently the abutment 54 exerts a force upon the sleeve shoulder 82 in the direction of the pullout force. The force applied by the abutment 54 upon the sleeve body portion 80 urges the sleeve tapered shoulder 90 into increased compressive relation with the fitting internal shoulder 28. As the force exerted by the insert 46 on the end 82 of the sleeve 62 increases, the compression of the shoulder 90 by the fitting shoulder 28 increases. The shoulder 90 deforms because it is being forced into an area of decreasing diameter in the direction of taper of the fitting shoulder 28. Thus the conduit 12 is compressed or squeezed by compression of the sleeve 62 into increased frictional engagement with the reinforcing insert 46.

Limited movement of the conduit 12 and the insert 46 is permitted in the fitting 14 until the sleeve 62 is locked in place in the fitting 14 by contact with the fitting shoulder 28. Also, compression of the conduit 12 by the compression of the sleeve 62 securely locks the conduit 12 onto insert 46. Thus the insert 46 and the conduit 12 are united or locked together preventing relative movement between the insert 46 and the conduit 12 thereby locking conduit 12 in place in the fitting 14.

With this embodiment and also as above discussed for the embodiment illustrated in FIGS. 1 and 2, as the pullout force on the conduit 12 increases the compressive forces on the conduit 12 increase to insure that the conduit 12 is retained within the fitting 14. Accordingly with this arrangement the conduit 12 will fail before the conduit is pulled out of the fitting 14.

To further enhance the compression of the sleeve compressible body 80, the sleeve body portion 80 in the embodiment illustrated in FIGS. 3A and 3B are provided with a plurality of longitudinally extending slots 102 that are spaced radially from one another on the periphery of the sleeve body portion enlarged diameter portion 84. As illustrated in FIG. 3A each of the slots 102 includes an open end 104 and a closed end 105. The slots extend from the sleeve tapered shoulder 90 to the sleeve tapered portion 86. With this arrangement as an axial pullout force is applied to the conduit 12, the slots 102 aid in compression of the sleeve 62 into surrounding and gripping engagement with the conduit 12 on the reinforcing insert 46.

Figure 6:
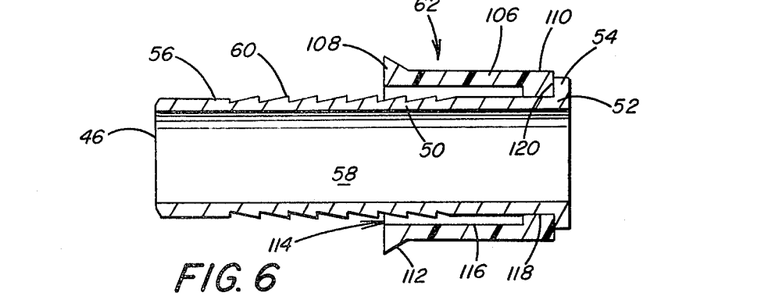
FIG. 6 is a view similar to FIG. 5 illustrating an embodiment of the sleeve having a body portion of substantially uniform diameter with a flared end portion where the sleeve is movable on the insert.

Now referring to FIGS. 6 and 7 there is illustrated a further embodiment of the compressible sleeve 62 that includes a unitary body portion 106 of a substantially uniform outer diameter and having a flared or outwardly tapered end portion 108. From the flared portion 108 the body portion 106 extends to an opposite end portion 110 adapted to engage in abutting relation the insert abutment 54. Also, the sleeve 62 has a substantially uniform outer diameter from the end portion 110 to the end portion 108 where the diameter of the sleeve flares outwardly thereby forming a tapered shoulder 112.

A passageway generally designated by the numeral 114 extends through the sleeve body portion 106. The passageway 114 includes an enlarged diameter portion 116 and a reduced diameter portion 118. The reduced diameter portion 118 is adapted for engagement with the outer surface of the reinforcing insert 46 adjacent the abutment 54. With this arrangement a shoulder 120 is formed at the sleeve end portion 110 arranged to contact the abutment 54.

The embodiment of the compressible sleeve 62 illustrated in FIGS. 6 and 7 is prefabricated of the same material comprising the other embodiments of the compressible sleeve 62 discussed above. The sleeve 62 illustrated in FIGS. 6 and 7 is prefabricated and formed separately of the reinforcing insert 46. Prior to insertion of the reinforcing insert 46 into the fitting 14 the sleeve body portion 106 is positioned on the insert 46 as illustrated in FIG. 6.

To carry out the connection of the conduit 12 to the fitting 14 with the embodiment of the sleeve 62 illustrated in FIGS. 6 and 7, the reinforcing insert 46 with the sleeve body portion thereon is advanced through the fitting open end portion 30 into the fitting bore 20. The diameter of the sleeve flared end portion 108 exceeds the internal diameter of the fitting throat 24. Thus to advance the end portion 108 through the fitting throat 24 the end portion 108 must be distorted. Accordingly distortion of the end portion 104 is enhanced by construction of the end portion 108 to progressively decrease in diameter in the direction of movement of the sleeve 62 into the fitting 14. By exerting a sufficient force upon the reinforcing insert 46, the flared end portion 108 is sufficiently distorted to provide clearance for the passage of the end portion 108 through the fitting throat 24. Once the sleeve 62 is advanced into the fitting enlarged diameter portion 22 the end portion 108 returns to its original configuration preventing the sleeve 62 from passing back through the throat 28 and out of the fitting 14.

As illustrated in FIG. 7 substantial clearance is provided between the sleeve body portion 106 and the inner surface of the fitting in the bore enlarged diameter portion 22. This permits the sleeve 62 shown in FIGS. 6 and 7 to be used with a wide variety of sizes of fittings as long as the sleeve flared end portion 108 exceeds the diameter of the passageway through the fitting throat 24 so as to block or obstruct movement of the sleeve 62 through the fitting throat 24 when a pullout force is exerted upon the conduit 12. As with the embodiments described above the embodiment of the sleeve 62 illustrated in FIG. 6 is positioned on the reinforcing insert 46 so that a shoulder 120 of the sleeve body portion 106 contacts the insert abutment 54.

With the embodiment of the compressible sleeve 62 illustrated if FIGS. 6 and 7, as above discussed with the embodiments illustrated in FIGS. 1–4, the end portion 110 of the compressible sleeve 62 surrounds the insert 46 and engages the insert abutment 54. Thus when the sleeve body 106 is compressed against the fitting internal shoulder 28 when a pullout force is applied to the conduit 12, the abutment 54 forces the sleeve 62 against the shoulder 28. The sleeve 62 can not move on the insert 46 when compressed between the abutment 54 at one end and the fitting internal shoulder 28 at the opposite end. The sleeve 62 is thus locked in place on the insert 46 and within the fitting 14.

As illustrated in FIG. 7, compression of the sleeve flared end portion 108 by the fitting internal shoulder 28 when a pullout force is applied to the conduit 12 restrains movement of the sleeve 62 in the direction of the pullout force on the conduit 12. This also prevents pullout of the insert 46 from the fitting 14 because the conduit 12 is compressed by the sleeve 62 onto the insert 46. Accordingly compression of the sleeve 62 and the conduit 12 on the insert 46 increases with an increase in the pullout force applied to the conduit 12. In this manner the present invention utilizes the pullout force applied to the conduit 12 to increase the compressive forces applied to the conduit 12 and the insert 46 to securely retain the conduit 12 and the insert 46 within the fitting 14 to resist the pullout force.

Figure 5:
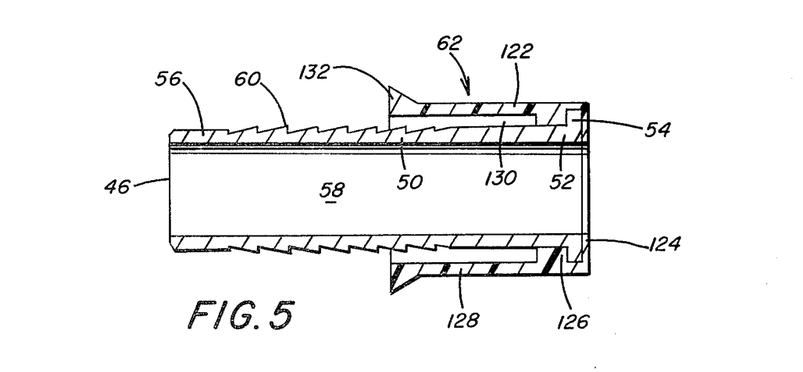
FIG. 5 is a fragmentary view in side elevation of an additional embodiment of the compressible sleeve molded into surrounding relation with the enlarged end portion of the insert thereby forming the sleeve integral with the insert.

Now referring to FIG. 5 there is illustrated another embodiment of the compressible sleeve 62 similar to the embodiment of the compressible sleeve 62 illustrated in FIG. 6. The sleeve 62 illustrated in FIG. 5 includes a compressible body portion 122 molded or suitably formed on the reinforcing insert 46. By premolding the body portion 122 on the reinforcing insert 46 the sleeve 62 is formed integral with the insert 46. This eliminates entirely relative movement between the sleeve 62 and the reinforcing insert 46.

The body portion 122 is formed on the insert 46 to completely encapsulate the abutment 54. The abutment 54 is surrounded by an end portion 124 and an inturned portion 126 that forms a reduced diameter portion of the sleeve 62 similar to the reduced diameter portion 118 for the sleeve 62 illustrated in FIG. 6. The sleeve body portion 122 also includes an enlarged diameter portion 128 that is spaced from the outer periphery of the insert 46. This arrangement forms an annular space 130 as above described for the sleeve 62 in FIG. 6. Similarly as with the sleeve body portion 106 in FIG. 6, sleeve body portion 122 in FIG. 5 includes a flared end portion 132. The flared end portion 132 is operable as above described to prevent withdrawal of the sleeve 62 from the fitting bore 20. The end portion 132 is also compressible by the fitting shoulder 28 when a pullout force is applied to the conduit 12 to compress the sleeve body portion 122.

Specifically with the embodiment of the compressible sleeve body portion 122 premolded on the reinforcing insert 46, the sleeve 62 is retained in a preselected position on the insert 46. Thus no relative movement is permitted between the sleeve 62 and the insert 46. Particularly, upon insertion of the insert 46 into the fitting 14, the body portion 122 will not move rearwardly on the insert 46 as the flared end portion 132 is compressed to permit the sleeve 62 to pass through the fitting throat 24. The operation of the compressible sleeve body portion 122 to compress the conduit 12 into gripping engagement with the serrations 60 of the insert 46 to resist pullout of the conduit 12 from the fitting 14 is the same as described above for the other embodiments of the compressible sleeve 62.

It should also be understood in accordance with the present invention that the sleeve 62 can also be retained on the insert 46 by means other than molding the elements together, as for example, by bonding the sleeve 62 to the insert 46 by an adhesive, force fitting the sleeve 62 on the insert 46, threadedly connecting the sleeve 62 and the insert 46, and the like.

According to the provisions of the patent statutes, I have explained the principle, preferred construction and mode of operation of my invention and have illustrated and described what I now consider its best embodiments. However, it should be understood, that within the scope of the appended claims the invention may be practiced otherwise than as specifically illustrated and described.

I claim:

1. A compression-type coupling for connection to a conduit comprising,
    a fitting having a body portion with a bore extending therethrough,
    said fitting body portion having a first tapered portion and a second tapered portion spaced axially from said first tapered portion,
    said first tapered portion forming an internal shoulder of said body portion surrounding said bore and said second tapered portion forming a restraining means,
    a sleeve positioned in said fitting bore, said sleeve including a body portion having a first end portion and a second end portion, said sleeve having a bore adapted to receive the conduit,
    a reinforcing insert positioned in said sleeve, said reinforcing insert and said sleeve positioned together as a unit in said fitting bore,
    said reinforcing insert including a tubular body portion having a diameter to facilitate insertion of said reinforcing insert in the conduit, said reinforcing insert including first and second end portions and a passageway extending therethrough,
    said reinforcing insert forming an annular space between said reinforcing insert and said sleeve,
    abutment means positioned on said reinforcing insert first end portion for engaging said insert to said sleeve first end portion,
    said sleeve including an internal shoulder positioned in surrounding relation with said insert first end portion so that said abutment means extends into said sleeve body portion to securely engage said insert to said sleeve, said sleeve internal shoulder forming a stop for receiving the conduit extending into said annular space between said sleeve and said reinforcing insert,
    said sleeve second end portion being positioned adjacent said fitting internal shoulder,
    said reinforcing insert and said sleeve being restrained for limited axial movement within said fitting between said fitting internal shoulder and said fitting restraining means upon movement of the conduit into said annular space between said sleeve and said reinforcing insert,
    gripping means extending between said reinforcing insert tubular body portion and the conduit positioned in said annular space for frictionally engaging the conduit to said reinforcing insert,
    said sleeve second end portion being urged against said fitting shoulder by the force of said reinforcing insert first end portion applied to said sleeve internal shoulder when a pullout force is applied to the conduit in a direction tending to pull the conduit out of said fitting, and
    said fitting internal shoulder applying upon said sleeve a compressive force which is transmitted through said sleeve body portion and said sleeve internal shoulder to the conduit to urge the conduit into increased frictional engagement with said insert to retain said insert in said fitting and prevent pullout of the conduit from said fitting.

2. A compression-type coupling as set forth in claim 1 in which,
    said sleeve is injection molded into said fitting in surrounding relation with said reinforcing insert in a preselected position in said fitting,
    said sleeve body portion being molded in surrounding relation with said reinforcing insert to contact said fitting body portion and selectively position said reinforcing insert in said fitting, and
    a portion of said sleeve body portion being spaced from said gripping means to form said annular space and said sleeve internal shoulder for receiving the conduit in frictional engagement with said gripping means.

3. A compression-type coupling as set forth in claim 1 in which,
    said sleeve body portion includes an outer surface abutting an inner surface of said fitting and an inner surface abutting said reinforcing insert so that a portion of said sleeve body portion extends from said reinforcing insert to said fitting, and
    said portion of said sleeve body portion being compressible to permit movement of said sleeve past said fitting internal shoulder into said bore.

4. A compression-type coupling as set forth in claim 1 which includes,
    said sleeve body portion being positioned in said fitting bore in spaced relation with said fitting body portion,
    said sleeve second end portion having a flared configuration arranged to extend outwardly into abutting relation with said fitting internal shoulder,
    said sleeve second end portion being compressible for movement in a first direction past said fitting internal shoulder into said bore, and said sleeve second end portion being expandable when positioned in said bore to abstruct movement of said sleeve in a second direction past said fitting internal shoulder and pullout of the conduit from said fitting.

5. A compression-type coupling as set forth in claim 1 which includes,
said sleeve body portion being compressible to permit movement of said sleeve relative to said fitting internal shoulder upon insertion of said sleeve into said fitting in a first direction, and
said sleeve body portion arranged to expand to an uncompressed state when positioned in said fitting bore so that contact of said sleeve body portion with said fitting internal shoulder obstructs movement of said sleeve in a second direction opposite to said first direction.

6. A compression-type coupling as set forth in claim 1 in which,
said sleeve body portion has a tapered portion connecting said first end portion to said second end portion,
said tapered portion being compressible to permit insertion of said sleeve into said fitting bore, and
said tapered portion arranged to move into abutting relation with said fitting internal shoulder when a pullout force is exerted upon the conduit to obstruct movement of said sleeve and compress said sleeve on the conduit to prevent removal of said sleeve and the conduit compressed by said sleeve from said fitting.

7. A compression-type coupling as set forth in claim 1 in which,
said sleeve body portion is compressible to reduce the outer diameter of said sleeve and permit distortion of said sleeve for insertion of said sleeve into said fitting, and
said sleeve body portion being compressed by said fitting body portion to urge the conduit into frictional engagement with said gripping means to prevent pullout of the conduit from said fitting when a pullout force is applied to the conduit.

8. A compression-type coupling as set forth in claim 1 which includes,
an annular sealing gasket positioned in said fitting bore in surrounding relation with the conduit and axially spaced from said sleeve,
a nut threadedly engageable with said fitting body portion in surrounding relation with said sealing gasket, and
said sealing gasket being compressed into contact with the conduit and said fitting body portion as said nut is threadedly advanced on said fitting to provide a fluid tight seal within said fitting around the conduit.

9. A compression-type coupling as set forth in claim 1 in which,
said reinforcing insert is positioned in the conduit for limited movement relative to the conduit in said fitting until said sleeve is moved into compression with said fitting internal shoulder when said pullout force is applied to the conduit and the conduit is compressed by said sleeve thereby restraining relative movement between said reinforcing insert and the conduit in said fitting.

10. A compression-type coupling as set forth in claim 1 which includes,
a plurality of slots extending a preselected length on said sleeve body portion,
said slots being radially spaced from one another around said sleeve body portion, and
said slots enhancing compression of said sleeve by said fitting internal shoulder in response to said pullout force on the conduit to secure the conduit in said fitting and resist removal of the conduit from said fitting when said pullout force is applied to the conduit in a direction to pull the conduit out of said fitting.

11. A compression-type coupling as set forth in claim 1 in which,
said fitting internal shoulder is operable to apply increasing compressive forces upon said sleeve as the magnitude of said pullout force acting on the conduit tending to pull the conduit out of the sleeve increases to increase the frictional engagement of the conduit to said reinforcing insert to resist pullout of the conduit from said fitting.

12. A compression-type coupling as set forth in claim 1 in which,
said abutment means for engaging said insert includes a shoulder on said reinforcing insert first end portion, and
said shoulder abutting said sleeve first end portion so that said sleeve is movable with said reinforcing insert upon the application of a pullout force on the conduit.

13. A compression-type coupling as set forth in claim 1 in which,
said fitting bore progressively decreases from an enlarged diameter portion to a reduced diameter portion in a direction of a force tending to pull the conduit out of the fitting, and
said sleeve being compressed into engagement with the conduit by contact with said progressively decreasing fitting bore as a pullout force is applied to the conduit.

14. A compression-type coupling as set forth in claim 1 in which,
said gripping means includes a plurality of annular serrations on said reinforcing insert operable to frictionally engage the conduit, and
said sleeve being compressed upon contact with said fitting internal shoulder to urge the conduit into increased frictionally engagement with said serrations to secure the conduit on said reinforcing insert and resist pullout of the conduit from said fitting.

15. A compression-type coupling as set forth in claim 1 in which,
said sleeve is premolded in surrounding relation with said reinforcing insert, and
said sleeve first end portion encapsulating said abutment means to secure said sleeve to said reinforcing insert to prevent relative movement therebetween.

16. A compression-type coupling as set forth in claim 1 in which,
said gripping means includes annular protrusions extending from the periphery of said reinforcing insert, and
said sleeve being compressed by said fitting body portion to forcefully compress the conduit on said reinforcing insert so that said protrusions are embedded into the conduit to prevent separation of the conduit from said reinforcing insert.

* * * * *